United States Patent [19]

Utsumi et al.

[11] Patent Number: 5,532,865
[45] Date of Patent: Jul. 2, 1996

[54] FIBER OPTIC COMMUNICATION TERMINAL, FIBER OPTIC COMMUNICATION SYSTEM, AND ITS WAVELENGTH SETTING METHOD

[75] Inventors: Kuniaki Utsumi, Sanda; Hiroaki Yamamoto; Katsuyuki Fujito, both of Higashiosaka, all of Japan

[73] Assignee: Matsushita Electric Industrial Co., Ltd., Osaka, Japan

[21] Appl. No.: 526,578

[22] Filed: Sep. 11, 1995

Related U.S. Application Data

[63] Continuation of Ser. No. 135,156, Oct. 12, 1993.

[30] Foreign Application Priority Data

Oct. 9, 1992 [JP] Japan .................. 4-271272

[51] Int. Cl.⁶ .................. H04B 10/06; H04B 10/04
[52] U.S. Cl. .................. 359/189; 359/190; 359/191; 359/194; 359/161; 359/180; 359/187; 359/132
[58] Field of Search .................. 359/110, 161, 359/173, 179, 189, 194, 180, 187, 190, 191

[56] References Cited

U.S. PATENT DOCUMENTS

| | | | |
|---|---|---|---|
| 4,742,576 | 5/1988 | McMahon | 359/124 |
| 4,947,134 | 8/1990 | Olsson | 359/173 |
| 5,033,114 | 7/1991 | Jayaraman et al. | 359/110 |
| 5,115,332 | 5/1992 | Naito et al. | 359/189 |
| 5,162,936 | 11/1992 | Taga et al. | 359/177 |
| 5,260,819 | 11/1993 | Hadjifotiou et al. | 359/173 |
| 5,291,326 | 3/1994 | Heidemann | 359/110 |
| 5,293,545 | 3/1994 | Huber | 359/161 |

FOREIGN PATENT DOCUMENTS

| | | |
|---|---|---|
| 0352747 | 1/1990 | European Pat. Off. . |
| 0445978 | 1/1991 | European Pat. Off. .................. 359/161 |
| 182930 | 10/1983 | Japan . |
| 219330 | 8/1990 | Japan . |
| 0191625 | 8/1991 | Japan .................. 359/194 |
| 157822 | 5/1992 | Japan . |

OTHER PUBLICATIONS

M. Meada et al., "Absolute Indentification and Stabilisation of DFB Lasers in 1°5 lm Region", Electronics Letters, vol. 25, No. 1, Jan. 1989.
I. Mito et al, "Frequency Tunable Laser Diodes and Their Application to Coherent System", 17th ECOC, Sep. 1988.
H. Tsushima et al., "1.244 Gbit/s 32 Channel 121 km Transmission Experiment Using Shelf-Mounted Continuous-Phase FSK Optical Heterodyne System", Electronics Letters, vol. 27, No. 25, Dec. 1991.
European Search Report dated 31 Jan. 1994.

*Primary Examiner*—Leo Boudreau
*Assistant Examiner*—Bhavesh Mehta
*Attorney, Agent, or Firm*—Ratner & Prestia

[57] ABSTRACT

In a fiber optic communication terminal composed of a light mixing part for mixing an input light signal and a light signal from own station, a detecting part for picking up a part of the output of the light mixing part to detect its quality deterioration, and a light source part in which the wavelength of output light is variable, increase of noise level or occurrence of bit error due to beat interference caused by mixing of input light signal and light signal from the own station is detected as quality deterioration in the detecting part, and by controlling the wavelength of the light source part accordingly, generation of beat interference can be prevented, and moreover by using a fiber optic communication terminal capable of maintaining the wavelength so that the signal quality may be the set value, the output light wavelength can be arranged at high density on the whole as a fiber optic communication system.

15 Claims, 3 Drawing Sheets

5,532,865

FIBER OPTIC COMMUNICATION TERMINAL, FIBER OPTIC COMMUNICATION SYSTEM, AND ITS WAVELENGTH SETTING METHOD

This application is a continuation of application Ser. No. 08/135,156 filed Oct. 12, 1993.

FIELD OF THE INVENTION

The present invention relates to a fiber optic communication terminal about a method of mixing light signals from plural terminals, transmitting through optical fibers, and receiving at one control terminal, a fiber optic communication system composed of a plurality of said fiber optic communication terminals, and a setting method of output light signal wavelength in said fiber optic communication system.

BACKGROUND OF THE INVENTION

A conventional fiber optic communication terminal is disclosed, for example, by Shibutani et al. in "Wide area video monitoring systems with subcarrier multiplex optical multi-access technique," Fall Meeting Issue B-711 of The institute of electronics, information and communication engineers 1992 which is incorporated herein by reference.

In the case of the conventional fiber optic communication system using this fiber optic communication terminal, light signals from fiber optic communication terminals are mixed, which are finally sent to the center station as one light signal. Although the light signals from the fiber optic communication terminals are mixed to be one light signal, since each fiber optic communication terminal modulates the light signal by an electric signal individually differing in the carrier frequency, it is same as when multiplexed by frequency division on the mixed light signal. Therefore, at the center station, since the frequency of the carrier assigned to each fiber optic communication terminal in known, the signals from the individual fiber optic communication terminals can be distinguished on the frequency axis of the received electric signal. Or when modulated by spread spectrum method, it is possible to distinguish the signals from the individual fiber optic communication terminals by demodulating accordingly at the center station.

In such constitution, however, if the wavelengths of light signals from the fiber optic communication terminals are close to each other, as the light signals interfere, beat interference occurs, which may adversely affect the signals, Generally, when two light signals interfere, and they are converted into electric signals, a signal of differential frequency of the two light signal frequencies is generated, and it is called beat interference or beat noise. If the frequency of this beat interference overlaps with the band of modulated signal, the modulated signal is influenced as a matter of course. Therefore, to prevent occurrence of this beat interference, it is necessary to set apart the wavelength of each light signal from each other. The separating distance of wavelength may be set so that beat interference may take place at a much higher frequency than the band of the modulated signal. For this purpose, the problem is that the light source must be selected so that the wavelengths of light sources of all fiber optic communication terminals be mutually different by more than a specific value.

SUMMARY OF THE INVENTION

The invention relates to a fiber optic communication terminal comprising a light source part for producing light signals, a light mixing part for mixing an input light from outside and an output light signal from the light source part, a light branching part for branching the mixed light signal as the output of the light mixing part into two, and sending out one thereof as an terminal output light signal to outside, a detecting part for detecting the deterioration of signal quality of the other branched light signal output from the light branching part and producing a detection signal, and a control part for controlling the wavelength of the output light signal of the light source part depending on the detection signal which is the output of the detecting part, and a system using a plurality of said fiber optic communication terminals, and moreover a method of arraying the wavelengths of light signals from all fiber optic communication terminals at high density as the entire system. Preferably in the fiber optic communication terminals, the functions of the light mixing part and light branching part are combined to realize by one fusion type optical coupler or one waveguide type optical coupler.

The invention, having such constitution, a part of the light signals mixed in the light mixing part is taken out by the light branching part, and increase of noise level due to beat interference or occurrence of bit error is detected by the detecting part, and the output light wavelength of the light source part in the own station is controlled, thereby preventing occurrence of beat interference. In the fiber optic communication system consisting of plural sets of the fiber optic communication terminal, by controlling the wavelength so that the noise level or bit error rate may be the set value, the wavelengths of output light of the fiber optic communication terminals on the entire system are arranged at high density.

As explained herein, in the invention, since the wavelengths of the light source parts of the terminals are automatically controlled so as not to generate beat interference, it is not necessary to prepare light source parts selected depending on the difference in the wavelength beforehand, nor is it necessary to add fiber optic communication terminals, or prepare light source parts selected depending on the difference in the wavelength even when replacing a defective light source part. Moreover, the wavelength array at high density is easily realized, and its practical effects are great.

DETAILED DESCRIPTION OF THE EMBODIMENT

Figure 1:
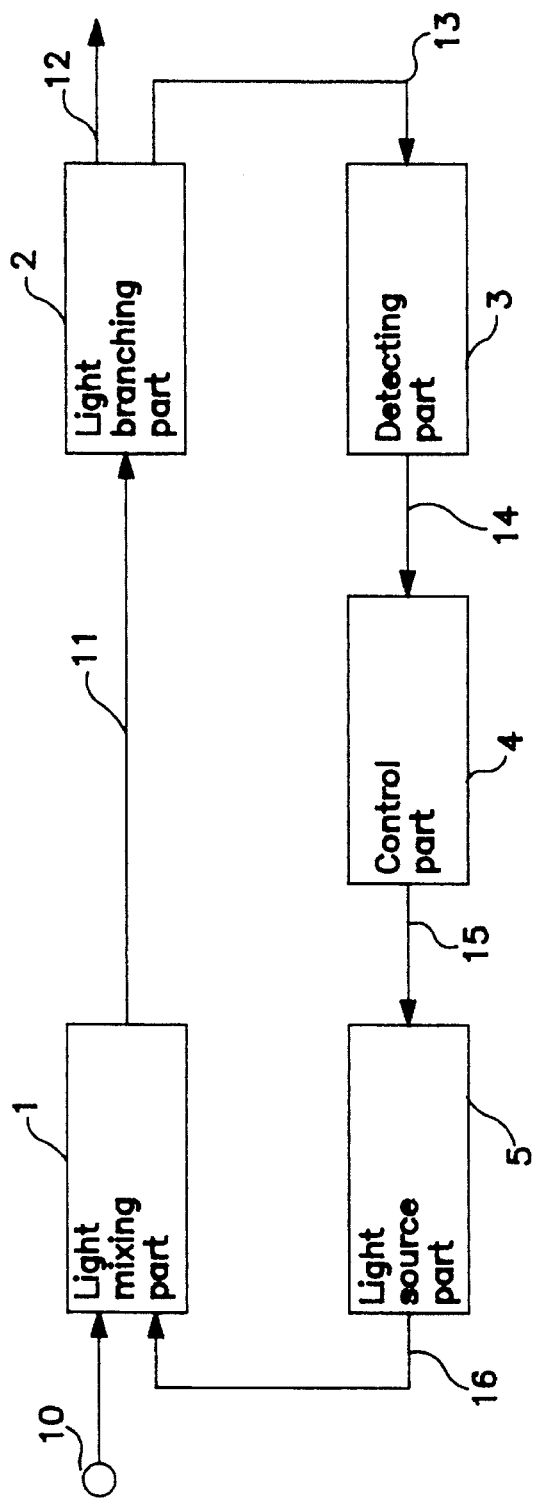
FIG. 1 is a block diagram showing a fiber optic communication terminal in an embodiment of the invention.

FIG. 1 is a block diagram of a fiber optic communication terminal in an embodiment of the invention. A block diagram of an entire system using a plurality of those fiber optic communication terminals is shown in FIG. 2.

In FIG. 1, numeral 10 denotes an input light signal from other terminal, 1 is a light mixing part for mixing the input light signal 10 and an output light signal 16 of this terminal, 11 is a mixed light signal of the output of the light mixing part 1, 2 is a light branching part for branching the mixed light signal 11 into two, 12 is a terminal output light signal of this terminal as one of the outputs of the light branching part 2, 13 is a branched light signal as the other output of the light branching part 2, 3 is a detecting part for detecting deterioration of signal quality of the branched light signal 13, 14 is a detection signal which is an output of the detecting part 3, 4 is a controlling part for controlling the light source part depending on the detection signal 14, 15 is a control signal which is an output of the controlling part 4, and 5 is a light source part for generating an output light signal 16 by receiving the control signal 15. As a matter of course, the light source part 5 possesses a function of modulating the output light signal 16 by the signal to be delivered which is not shown herein.

Figure 2:
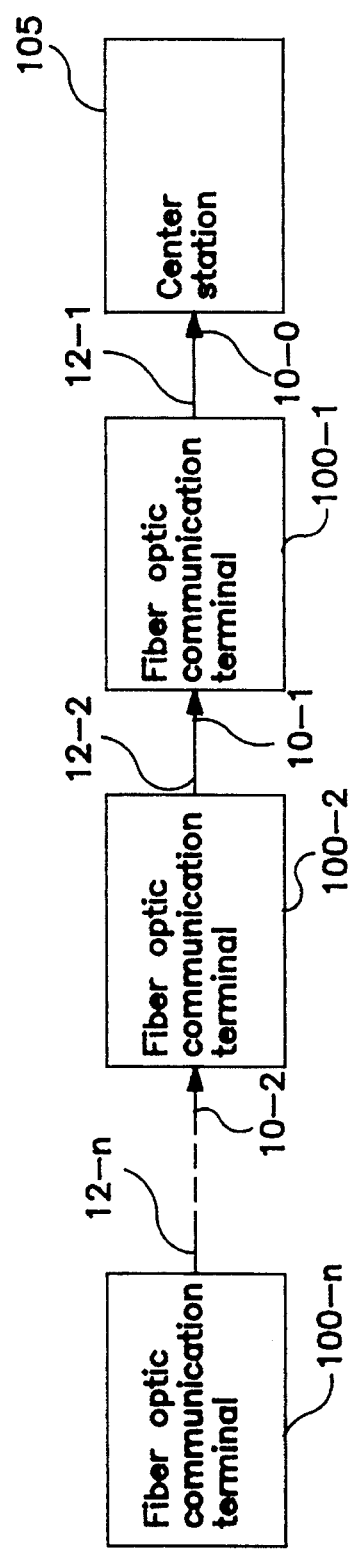
FIG. 2 is a system block diagram of a fiber optic communication system in an embodiment of the invention.

In FIG. 2, numerals 100-1 to 100-n represent fiber optic communication terminals connected in cascade through optical fibers, 105 is a center station located at the most upstream position for collecting information from the fiber optic communication terminal 100-1 to the fiber optic communication terminal 100-n, 12-1 to 12-n are terminal output light signals of the fiber optic communication terminals 100-1 to 100-n respectively, 10-1, 10-2 are input light signals of the fiber optic communication terminals 100-1, 100-2, respectively, and 10-0 is a center input light signal into the center station 105. The terminal output light signal and the corresponding input light terminal of the next terminal, for example, the terminal output light signal 12-2 of fiber optic communication terminal 100-2 and input light signal 10-1 of fiber optic communication terminal 100-1, or terminal output light signal 12-1 of fiber optic communication terminal 100-1 and center input light signal 10-0 of center station 105 differ from each other by the portion of transmission deterioration such as transmission loss, but generally they may be regarded to be the same in the invention.

In the embodiment, since the fiber optic communication terminal 100-n is at the most downstream side away from the center station, the input light signal to the fiber optic communication terminal 100-n does not exist.

In thus composed fiber optic communication terminals the embodiment and the entire system using them, the operation is described below.

The input light signal 10 from the downstream side terminal and the modulated output light signal 16 from the light source part 5 at this terminal are mixed in the light mixing part 1. The mixed light signal 11 is branched into two light signals by the light branching part 2. The branching ratio is determined at the optimum value by the individual system. Of the outputs from the light branching part 2, one is transmitted to the upstream side terminal or the center station as terminal output light signal 12. The other branched light signal 13 is sent to the detecting part 3. The detecting part 3 converts the branched light signal 13 into an electric signal, and monitors the signal quality of the branched light signal 13, and detects the quality level. The result is sent to the control part 4 as detection signal 14. The control part 4 sends a control signal 15 for controlling the light source part 5 depending on the detection signal 14 to the light source part 5. The light source part 5 is controlled by the control signal 15, and varies the wavelength of its output light signal 16.

In the light mixing part 1, when the wavelengths of the input light signal 10 and output light signal 16 are close to each other and beat interference occurs, the signal quality of the branched light signal 13 which is a part of the mixed light signal 11 deteriorates. This deterioration is detected by the detecting part 3, and therefore the wavelength of the output light signal 16 from the light source part 5 is varied through the control part 4 in a direction of not causing beat interference. In order that the signal quality of the branched light signal 13 may not deteriorate, the wavelength of the output light signal 16 from the light source part 5 is controlled, and consequently beat interference does not take place in the terminal output light signal 12, either.

On the entire system, since the fiber optic communication terminals 100-1 to 100-n are connected in cascade, as far as the fiber optic communication terminals 100-1 to 100-n operate individually as described above, beat interference will not occur in each fiber optic communication terminal, and finally the center station 105 can receive the center input light signal 10-0 free from beat interference.

Since the fusion type optical coupler is fabricated by fusing optical fiber, it is of two-input, two-output type when fabricated from two optical fibers. Therefore, the both functions of the light mixing part 1 and light branching part 2 can be simultaneously realized by using a fusion type optical coupler. It is, however, generally difficult to set the mixing ratio and branching ratio independently at desired values. Or by using an waveguide type optical coupler, too, the both functions of the light mixing part 1 and light branching part 2 can be realized simultaneously. What is more, in the waveguide type optical coupler, the mixing ratio and branching ratio can be set independently.

Figure 3:
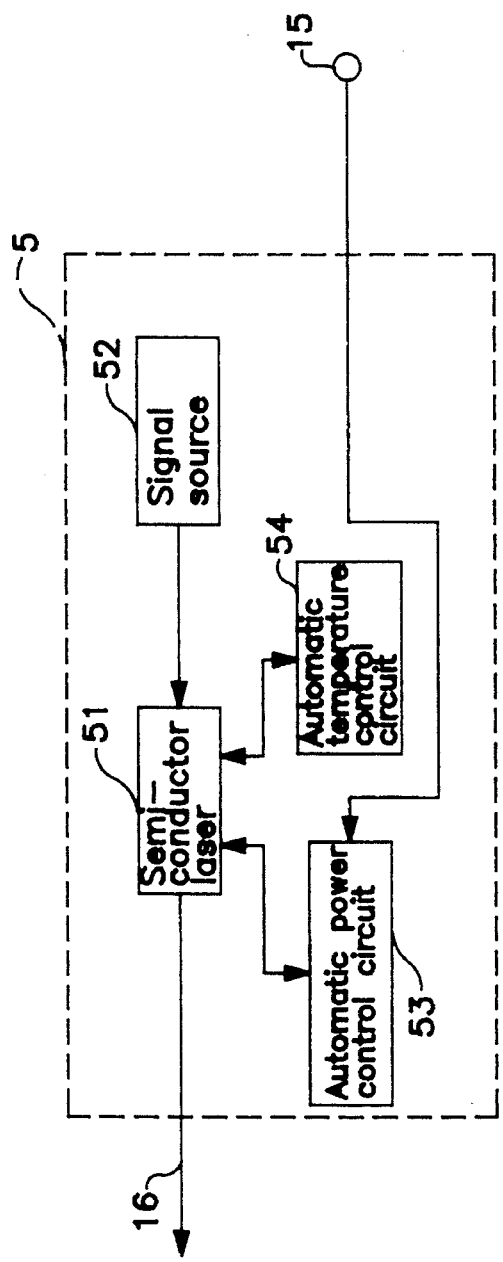
FIG. 3 is a detailed block diagram of a light source part for controlling the output of semiconductor laser in an embodiment of the invention.
Figure 4:
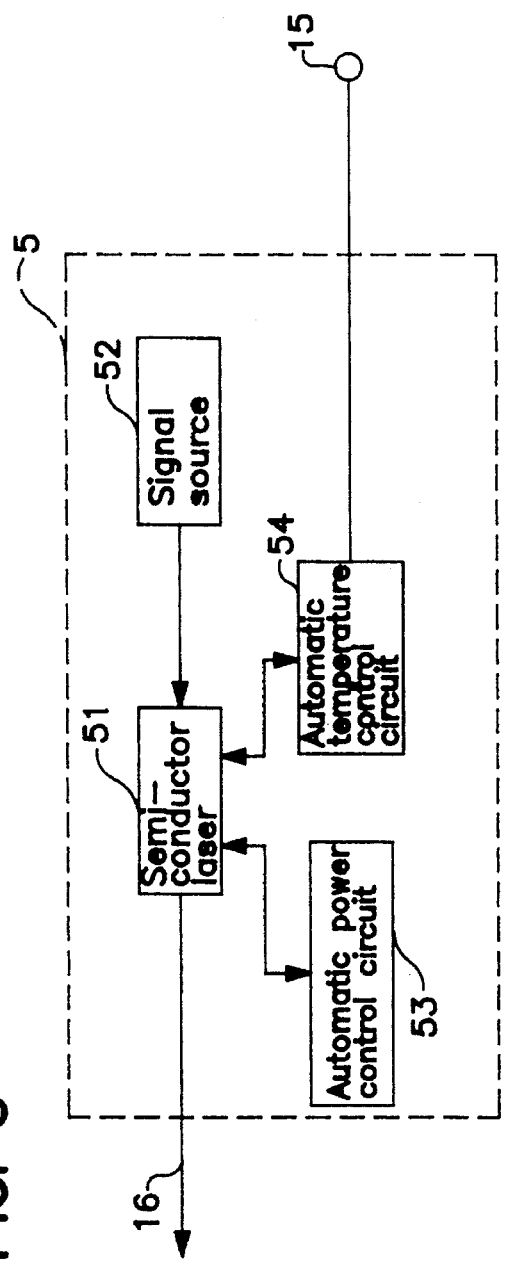
FIG. 4 is a detailed block diagram of a light source part for controlling the temperature of semiconductor laser in an embodiment of the invention.

When semiconductor laser is used as the light source of the light source part 5, to vary the wavelength of the output light of semiconductor laser, an easy method is to change the quantity of current flowing in the semiconductor laser or change the temperature of the semiconductor laser. Generally, the semiconductor laser is stabilized in its bias current and temperature, and the circuits for these purposes are respectively automatic power control circuit and automatic temperature control circuit. Therefore, when the control part 4 is designed to control the target output set value of the automatic power control circuit, or the target temperature set value of the automatic temperature control circuit by the control signal 15, the wavelength of the output Light signal 16 which is the output of the semiconductor can be easily varied. FIG. 3 is a detailed block diagram of the light source part 5 when changing the wavelength of the output light signal 16 by controlling the bias current of the semiconductor laser by the control signal 15, and FIG. 4 is a detailed block diagram of the light source part 5 when changing the wavelength of the output light signal 16 by controlling the temperature of the semiconductor laser by the control signal 15. In FIGS. 3 and 4, numeral 51 denotes a semiconductor laser, 52 is a signal source, 53 is an automatic power control circuit, and 54 is an automatic temperature control circuit.

The signal source 52 represents the entire function for producing an electric signal that the fiber optic communication terminal delivers the light signal 16 as carrier, and modulating the semiconductor laser 51, or, depending on the case, the function of modulating the semiconductor laser 51 by an external signal.

The automatic power control circuit 53 detects the output of the semiconductor laser 51, that is, the output level of the output light signal 16, and stabilizes the output level to be a target output set value. Similarly, the automatic temperature control circuit 54 detects the temperature of the semiconductor laser 51, and stabilizes the value to be a target temperature set value.

In the case of FIG. 3, when the target output set value of the automatic power control circuit 53 is changed by the control signal 15, the automatic power control circuit 53 accordingly varies the bias current of the semiconductor laser 51. As a result, the output level of the output light signal 16 of the semiconductor laser is changed. When the output level is changed, the wavelength of the output light signal 16 is changed at the same time. By this series of action, the wavelength of the output light signal 16 can be controlled by the control signal 15.

In the case of FIG. 4, when the target temperature set value of the automatic temperature control circuit 54 is changed by the control signal 15, the automatic temperature control circuit 54 accordingly changes the temperature of the semiconductor laser 51. As a result, the wavelength of the output light signal 16 of the semiconductor laser is changed. By this action, the wavelength of the output light signal 16 can be controlled by the control signal 15.

In this method, the wavelength may be easily controlled in a range not to affect the signal quality or reliability of semiconductor laser.

As the light source of the light source part 5, when a wavelength variable light source, for example, a semiconductor laser with external resonator is used, the control part 4 mechanically controls the external resonator by the control signal 15, thereby varying the wavelength of the output light signal 16 which is the output of the semiconductor laser with external resonator.

Or, as the light source of the light source part 5, when a wavelength variable multiple-electrode semiconductor laser is used, the control part 4 controls the current to the control electrode of the multiple-electrode semiconductor laser, thereby varying the wavelength of the output light signal 16 which is the multiple-electrode semiconductor laser output.

Figure 5:
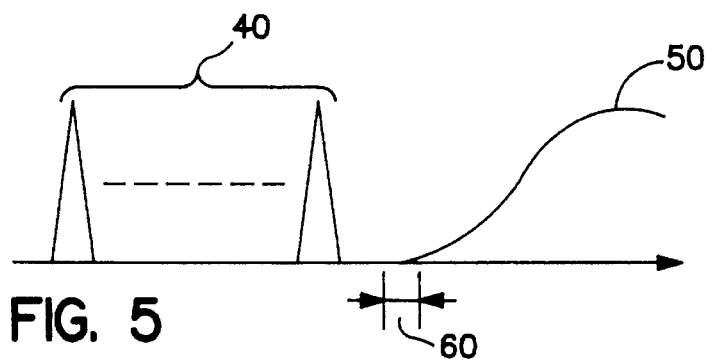
FIG. 5 is a frequency spectrum of signal when detecting noise level in the detecting part of the fiber optic communication terminal in an embodiment of the invention.

As the method of detection of deterioration of signal quality of the branch output 13 in the detecting part 3, detection of noise level or bit error is known. When detecting the noise level, the detecting part 3 detects the power in a specific band, and controls the wavelength of the output light signal 16 so that the level may be lower than the set value or maintained at the set value. The band for monitoring the noise level should be set at high frequency as far as possible. This is because, when the wavelength is gradually changed from the normal state to induce beat interference, the effect of beat interference begins to appear from higher frequency. This mode is explained by reference to the frequency spectrum in FIG. 5. FIG. 5 shows a frequency spectrum of electric signal when the branched light signal 13 is demodulated into an electric signal in the detecting part 3. In FIG. 5, numeral 40 is a transmission signal to be transmitted originally, 50 is a disturbing wave by beat interference, and 60 is a monitoring band for monitoring noise level. In the state of FIG. 5, it is supposed that the effect of the disturbing wave 50 on the transmission signal 40 is at a negligible limit level. If the disturbing wave 50 approaches a lower frequency band than this state on the frequency axis, that is, to the transmission signal 40 until the foot of the disturbing wave 50 is detected as increase of noise level in the monitoring band 60, the light source part 5 is controlled through the control part 4, and the wavelength of the output light signal 16 is changed so that the noise level may not increase further. Therefore, the spectral relation as shown in FIG. 5 is maintained, and the effect of the disturbing wave 50 on the transmission signal 40 is maintained at a negligible level. Hence, by monitoring the noise level in higher frequency band, the effect on the transmission signal 40 becomes smaller, and it is desired to set the monitoring band 60 at high frequency as far as possible. This method requires only monitoring of noise level, and does not depend on the signal format, and if using spread spectrum signal, this method can be applied as far as the signal band and the noise level monitoring band are separated.

The monitoring band may be set in the same frequency band or in different bands in the individual fiber optic communication terminals. However, when setting in the same frequency band, the time constant of response or setting of noise level at each fiber optic communication terminal must be adjusted in each fiber optic communication terminal.

Figure 6:
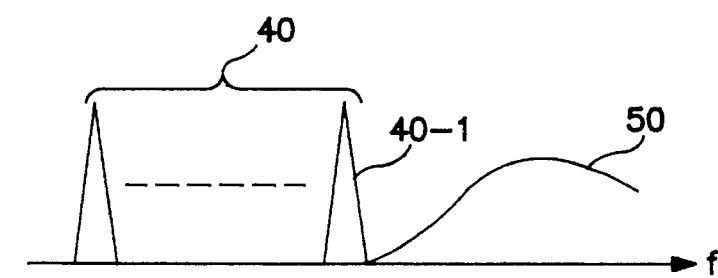
FIG. 6 is a frequency spectrum of signal when detecting bit error rate in the detecting part of the fiber optic communication terminal in an embodiment of the invention.

When detecting increase of bit error, the principle of operation is almost same as in the case by the noise level, and a bit error of a specific digital data is detected, and the wavelength of the output light signal 16 is controlled so that the bit error rate may be lower than a set value or be maintained at the set value. If there are a plurality of signals for detection of bit error, it should be detected by the signal of the highest frequency among them. The reason is same as when detecting the noise level, and its mode is explained by reference to the frequency spectrum in FIG. 6. In FIG. 6, numeral 40 denotes a frequency division multiplexed transmission signal to be transmitted originally, and 40-1 of it is a bit error detection signal which is a digital modulated signal to be detected of bit error, and 50 is a disturbing wave by beat interference. The state in FIG. 6 is assumed that the bit error rate in the bit error detection signal 40-1 is at an allowable limit. When the disturbing wave 50 becomes closer to the transmission signal 40 from this state on the frequency axis, and the foot of the disturbing wave 50 affects the bit error detection signal 40-1 and is detected as a bit error beyond the allowable limit by the detecting part 3, the light source part 5 is controlled through the control part 4, and the wavelength of the output light signal 16 is changed so that the bit error signal may not increase further, thereby maintaining the relation as shown in FIG. 6, and the effect of the disturbing wave 50 on the transmission signal 40 becomes a negligible level lower than the set error rate. Therefore, same as in the case of monitoring the noise level, the bit error should be detected by the signal of high frequency as far as possible.

Figure 7:
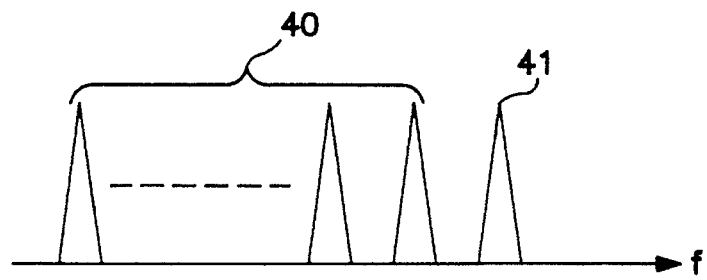
FIG. 7 is a frequency spectrum of signal when adding a signal for detection in the detecting part of the fiber optic communication terminal in an embodiment of the invention.

In the case of detection of bit error, if signal of high frequency is not available as a bit error detection signal capable of detecting a bit error, or if there is no bit error detection signal capable of detecting a bit error at all, or if it is difficult, a signal for detection capable of easily detecting a bit error should be added. At this time, as shown in FIG. 7, it is desired to set the detection signal 41 at a higher frequency than the transmission signal 40. The reason of setting at high frequency is same as mentioned above.

As the signal for detecting a bit error rate, either same or different ones may be used in the individual fiber optic communication terminals, but when same ones are used, it is necessary to adjust and change the set value of the bit error rate in each fiber optic communication terminal. Generally, the worse value should be set at the side closer to the center station 105.

In this embodiment, it is controlled so as to maintain the target noise level or error rate, but if the margin is insufficient, the detection level of noise level or error rate must be set lower, and it is technically difficult to detect the value directly. If such problem exists, when the noise level or error rate larger than the set level is detected, instead of maintaining the wavelength of the output light signal 16 at the wavelength at that time, it should be changed by a specified portion to the direction of not causing beat interference from that wavelength. For such control, as the control part 4, computer control using a microcomputer is suited. In such a method, however, if the wavelength is changed suddenly as in frequency hop, the fiber optic communication terminal at the closer side to the center station 105 cannot follow the change, and normal operation may not be expected. Therefore, it is necessary to change gradually at a certain time constant so as to avoid sudden change. In this method, a sufficient margin can be maintained, and the detection level of noise level or error rate can be set somewhat larger, and the circuit may be realized easily.

When the fiber optic communication system as shown in FIG. 2 is composed by using the fiber optic communication terminals of the invention, generally, the normal state may be maintained by the operation as mentioned above, but once falling in abnormal wavelength configuration status due to blackout, system breakdown or other abnormality, the normal state may not be always restored if the same operation as mentioned above is done independently in the fiber optic communication terminals. For example, if the wavelength of the output light signal of a certain fiber optic communication terminal is enclosed by two wavelengths of output light signals of two downstream side fiber optic communication terminals, and if this interval is so small that another wavelength signal cannot normally exist in, it is impossible to get out of these two wavelengths in the above operation. In such situation, if it is detected that it is impossible to get out of the two wavelengths, the wavelength should be changed by force to such an extent as to be capable of getting out of the two wavelengths. Detection of such situation may be judged when the signal quality does not achieve the desired level if the control part 4 operates continuously longer than a specific set time. The control part 4 judges the abnormal state if the signal quality does not reach the desired level if continued to operate longer than a specific set time, and changes the output signal wavelength of the light source part 5 by force by a set amount. When each fiber optic communication terminal possesses this function, if the entire system falls in an abnormal state, a normal state can be restored as each fiber optic communication terminal operates independently. From the viewpoint of realizing such function, too, computer control using a microcomputer is suited as the control part 4.

As the fiber optic communication system, the technique for arranging the light output wavelengths of all fiber optic communication terminals is explained below by reference to FIG. 2.

The fiber optic communication terminals 100-1 to 100-n operate to change continuously the wavelengths until the signal quality reaches the set value individually, and moreover when receiving a start command of initialization operation, each one starts the above operation from the end of either long wavelength side or short wavelength side of the wavelength variable range of the own light source part. Which end to start operation from may be determined in each system. The set value of the signal quality is, as a matter of course, the level where normal operation is enabled.

An example of a technique is explained below. In the first place, the center station 105 sends a start command of initialization operation to all fiber optic communication terminals 100-1 to 100-n by some means. Upon receiving the start command, the fiber optic communication terminal 100-n at the furthest side first sets the wavelength of its own light output. In this case, it is set in the shortest wavelength in the wavelength variable range. Consequently, the second fiber optic communication terminal from the downstream side starts from the longest wavelength, and continues to change the wavelength to the shorter wavelength side until the signal quality of the light output becomes a set value. In such action, normal operation is possible, and the wavelength arrangement as close as possible may be realized and maintained. Similarly, in the third and subsequent fiber optic communication terminals, the same operation as above is done sequentially at time intervals specified by a timer or the like. In this way, the wavelengths can be arranged at high density as far as possible, and the number of multiplexes is more than the case of sorting the wavelengths of the light source part by taking the margin into consideration, that is, the number of fiber optic communication terminals that can be connected can be increased.

Incidentally, instead of setting the wavelength of the light output of the fiber optic communication terminal 100-n at the furthest side at the shortest wavelength side as mentioned above, it may be also possible to start operation from the other fiber optic communication terminal of the shorter wavelength side by setting at the longest wavelength side. Otherwise, the wavelength of the fiber optic communication terminal 100-n at the furthest side may be set at an intermediate value of the wavelength variable range, and the operation may be started from the long wavelength end or short wavelength end where the other terminal is designated. Anyway, the fiber optic communication terminal 100-n at the furthest side affects the entire system, and therefore the light output signal of predetermined wavelength must be produced stably, and the stability of the wavelength is particularly demanded because there is no input light signal to the own station.

Figure 8:
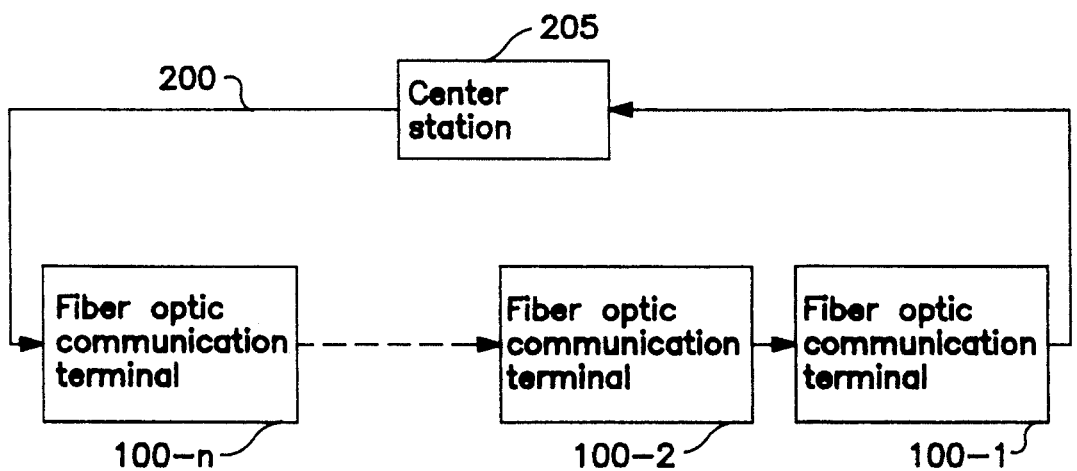
FIG. 8 is a system block diagram of fiber optic communication system to be connected in a ring in an embodiment of the invention.

As shown in FIG. 8, a similar fiber optic communication system is realized by connecting the fiber optic communication terminals 100-1 to 100-n and a center station 205 capable of producing a center output light signal 200 in a ring form through optical fibers. By connecting in a ring form, it is easy to send the information from the center station 205, for example, the start command of initialization action as mentioned above, to the fiber optic communication terminals 100-1 to 100-n. Moreover, in the former example of wavelength arrangement method, the fiber optic communication terminal 100-n at the furthest side determined the initial value of the wavelength arrangement, but when connected in a ring form, the center station 205 can determine the initial value of wavelength by producing the center output light signal 200. Hence, particular action is not needed in the fiber optic communication terminal 100-n at the furthest side, and all fiber optic communication terminals 100-1 to 100-n can operate alike. Except when the center station 205 determines the initial value of wavelength, the operation is same as the fiber optic communication system. If desired to shift the wavelength during operation, the wavelength of the center output light signal 200 can be changed gradually, so that it is possible to shift the wavelength of the entire fiber optic communication system while maintaining the high density arrangement.

What is claimed is:

1. A fiber optic communication terminal comprising:

light source means for producing an output light signal having a wavelength and a spectrum distribution of a specified shape, light mixing means for mixing an input light and the output light signal from the light source means, light branching means for separating the mixed light signal output from the light mixing means into a first light signal and a second light signal each having respective signal qualities, said second light signal having a noise level and a bit error rate, detecting means for detecting deterioration of the signal quality of the second light signal from the light branching means by detecting one of the noise level and the bit error rate of the second light signal and producing a detection signal, and control means for controlling the wavelength of the output light signal of the light source means in response to the detection signal to prevent deterioration of the signal quality of the first light signal regardless of the specified shape of the spectrum distribution of the output light signal emitted by the light source means.

2. A fiber optic communication terminal of claim 1, wherein the light mixing means and light branching means are included in a fusion type optical coupler.

3. A fiber optic communication terminal of claim 1, wherein the light mixing means and light branching means are included in one waveguide type optical coupler.

4. A fiber optic communication terminal of claim 1, wherein the light source means has a light source which is a semiconductor laser producing a semiconductor light having a semiconductor wavelength, said semiconductor laser having a temperature and a bias current, said semiconductor wavelength is controlled by controlling one of the temperature and the bias current of the semiconductor laser.

5. A fiber optic communication terminal of claim 1, wherein the light source means has a semiconductor laser having a wavelength variable function.

6. A fiber optic communication terminal of claim 1, wherein the detecting means produces the detection signal depending on the noise level.

7. A fiber optic communication terminal of claim 1, wherein the detecting means produces the detection signal depending on the bit error rate.

8. A fiber optic communication terminal of claim 7, wherein the light source means produces the output light signal by modulating the light signal with a frequency multiplexed signal, said light signal having at least one carrier which is digitally modulated, and the detecting means detects the bit error rate of the digitally modulated light signal having the highest frequency.

9. A fiber optic communication terminal of claim 7, wherein the light source means produces the output light signal by modulating the light signal with a modulating signal, said modulating signal combined with a bit error rate signal for detecting a higher frequency bit error rate, said bit error signal having a higher frequency than the output light signal, and the detecting means detects the bit error rate using the bit error rate signal for detection of bit error rate.

10. A fiber optic communication terminal of claim 1, wherein the wavelength of the output light signal of the light source means is changed by a preset value to maintain the output light signal in the same state when the detecting means detects deterioration of the signal quality of the second light signal.

11. A fiber optic communication terminal of claim 1, wherein when the detecting means detects deterioration of signal quality of the second light signal, the wavelength of output light signal of the light source means is changed using the control means which continues to operate for a preset time in order to decrease or maintain the deterioration of the signal quality, if the deterioration of the signal quality cannot be decreased or maintained, the wavelength of output light signal of the light source means is changed by a preset amount, and then the control means continues to change the wavelength of output light signal of the light source means.

12. A fiber optic communication system comprising:

a plurality of fiber optic communication terminals, each one of the plurality of fiber optic communication terminals comprising:
(a) light source means for producing an output light signal having a wavelength and a spectrum distribution of a specified shape,
(b) light mixing means for mixing an input light and the output light signal from the light source means,
(c) light branching means for separating the mixed light signal output from the light mixing means into a first light signal and a second light signal each having respective signal qualities, said second light signal having one of a noise level and a bit error rate,
(d) detecting means for detecting deterioration of the signal quality of the second light signal from the light branching means by detecting one of the noise level and the bit error rate of the second light signal and producing a detection signal, and
(e) control means for controlling the wavelength of the output light signal of the light source means in response to the detection signal to prevent deterioration of the signal quality of the first light signal regardless of the specified shape of the spectrum distribution of the output light signal emitted by the light source means, and one center station, the plurality of fiber optic communication terminals and the one center station coupled in cascade through optical fibers where the one center station is at one end, the one center station receives light signals from all of the plurality of the fiber optic communication terminals.

13. A fiber optic communication system comprising:

a plurality of fiber optic communication terminals each one of the plurality of fiber optic communication terminals comprising:
(a) light source means for producing an output light signal having a wavelength and a spectrum distribution of a specified shade,
(b) light mixing means for mixing an input light and the output light signal from the light source means,
(c) light branching means for separating the mixed light signal output from the light mixing means into a first light signal and a second light signal each having respective signal qualities, said second light signal having one of a noise level and a bit error rate,
(d) detecting means for detecting deterioration of the signal quality of the second light signal from the light branching means by detecting one of the noise level and the bit error rate of the second light signal and producing a detection signal, and
(e) control means for controlling the wavelength of the output light signal of the light source means in response to the detection signal to prevent deterioration of the signal quality of the first light signal regardless of the specified shape of the spectrum distribution of the output light signal emitted by the light source means, and one center station, the plurality of communication terminals and the one center coupled annularly in cascade through optical fibers, where the one center station receives light signals from all of the plurality of the fiber optic communication terminals, and the center station having a center station light signal which is provided to the plurality of fiber optic communication terminals.

14. A method of setting wavelengths for a fiber optic communication system comprising:
   (a) a plurality of fiber optic communication terminals comprising:
      (1) light source means for producing an output light signal having a wavelength and a spectrum distribution of a specified shape,
      (2) light mixing means for mixing an input light signal and the output light signal from the light source means,
      (3) light branching means for separating the mixed light signal output from the light mixing means into a first light signal and a second light signal each having respective signal qualities, said second light signal having one of a noise level and a bit error rate,
      (4) detecting means for detecting deterioration of the signal quality of the second light signal from the light branching means by detecting one of the noise level and the bit error rate of the second light signal and producing a detection signal depending on one of the bit error rate and the noise level, and
      (5) control means for controlling the wavelength of the output light signal of the light source means in response to the detection signal to maintain the signal quality of the first light signal,
   (b) one center station, the plurality of fiber optic communication terminals and the one center station coupled in cascade through optical fibers, wherein the one center station is at one end, and the one center station receives light signals from all of the plurality of fiber optic communication terminals, and
   (c) a remote communication terminal which is one of the plurality of communication terminals which is located at a most remote position on a furthest side from the one center station, said method comprising the steps of:
      transmitting a remote output light signal from the remote communication terminal, said remote output light signal having a remote communication terminal wavelength; and
      sequentially setting, with respect to the remote communication terminal wavelength, the wavelength of the output light signal of each one of the plurality of fiber optic communication terminals starting from the fiber optic communication terminal located at a next most remote position on the furthest side from the one center station;
   wherein the wavelengths of the output light signals are set to prevent deterioration of the signal quality of the first light signal of each one of the plurality of fiber optic communication terminals regardless of the specified shape of the spectrum distribution of the output light signal emitted by the light source means of each one of the plurality of fiber optic communication terminals.

15. A method of setting wavelengths for a fiber optic communication system comprising:
   (a) a plurality of fiber optic communication terminals comprising:
      (1) light source means for producing an output light signal having a wavelength and a spectrum distribution of a specified shape,
      (2) light mixing means for mixing an input light signal and the output light signal from the light source means,
      (3) light branching means for separating the mixed light signal output from the light mixing means into a first light signal and a second light signal each having respective signal qualities,
      (4) detecting means for detecting deterioration of the signal quality of the second light signal from the light branching means by detecting one of the noise level and the bit error rate of the second light signal and producing a detection signal depending on one of the bit error rate and the noise level, and
      (5) control means for controlling the wavelength of the output light signal of the light source means in response to the detection signal to maintain the signal quality of the first light signal, and
   (b) one center station having an output side, the plurality of communication terminals and the one center station connected annularly in cascade through optical fibers, wherein the light signals from all of the plurality of fiber optic communication terminals are received by the one center station, said one center station providing a center station light signal to the plurality of fiber optic communication terminals, said method comprising the steps of:
      transmitting the center station light signal from the one center station, said center station light signal having a center station wavelength; and
      sequentially setting, with respect to the center station wavelength, the wavelength of the output light signal of each one of the plurality of fiber optic communication terminals starting from one of the plurality of fiber optic communication terminals closest to the output side of the center station to the plurality of fiber optic communication terminals progressing gradually further from the output side of the center station;
   wherein the wavelengths of the output light signals are set to prevent deterioration of the signal quality of the first light signal of each one of the plurality of fiber optic communication terminals regardless of the specified shape of the spectrum distribution of the output light signal emitted by the light source means of each one of the plurality of fiber optic communication terminals.

* * * * *

UNITED STATES PATENT AND TRADE MARK OFFICE
CERTIFICATE OF CORRECTION

PATENT NO.   : 5,532,865
DATED        : July 2, 1996
INVENTOR(S)  : Utsumi et al.

It is certified that error appears in the above-identified patent and that said Letters Patent is hereby corrected as shown below:

Column 10, line 46, "shade" should be --shape--.

Signed and Sealed this

Fifth Day of November, 1996

*Attest:*

BRUCE LEHMAN

*Attesting Officer*     *Commissioner of Patents and Trademarks*